United States Patent [19]

Karpowicz et al.

[11] Patent Number: 4,554,492

[45] Date of Patent: Nov. 19, 1985

[54] MOTOR CONTROL SYSTEM

[75] Inventors: John L. Karpowicz, Crystal Lake; Randall A. Zielsdorf, Mundelein, both of Ill.

[73] Assignee: Baxter Travenol Laboratories, Inc., Deerfield, Ill.

[21] Appl. No.: 688,283

[22] Filed: Jan. 4, 1985

Related U.S. Application Data

[63] Continuation of Ser. No. 561,685, Dec. 15, 1983, abandoned.

[51] Int. Cl.$^4$ .............................................. G05B 5/00
[52] U.S. Cl. .................................... 318/309; 318/311; 318/326
[58] Field of Search ................ 364/565, 566; 318/311, 318/326, 309, 327, 331, 317; 324/160, 161, 177

[56] References Cited

U.S. PATENT DOCUMENTS

| | | | |
|---|---|---|---|
| 3,284,688 | 11/1966 | Black | 318/326 X |
| 3,526,819 | 9/1970 | Graf | 318/327 X |
| 3,599,063 | 8/1971 | Nanai et al. | 318/327 |
| 3,707,660 | 12/1972 | Nijhof et al. | 318/326 |
| 3,735,225 | 5/1973 | Raatz | 318/327 X |
| 3,778,693 | 12/1973 | Korteling | 318/326 X |
| 4,090,116 | 5/1978 | Lippitt | 318/327 X |
| 4,147,966 | 4/1979 | Kain et al. | 318/327 |
| 4,216,417 | 8/1980 | Anderson et al. | 318/274 |
| 4,375,609 | 3/1983 | Wolf | 318/317 |
| 4,413,212 | 11/1983 | Okamoto et al. | 318/327 X |

OTHER PUBLICATIONS

DC Motors Speed Controls Servo Systems, Handbook by Electro-Craft Corp. Machine Design Publication, May 19, 1977, issue.
Intel iSBC Applications Handbook, (Sep. 1981), pp. 3-80, through 3-87.
Electro-Craft Corporation Series E-586 Instruction Manual (Jan. 1982).
Intersil Data Book (Jul. 1979), pp. 5-11.
Signetics Corporation Analog Applications Manual (1979), pp. 334-338.
Intel Microcontroller Applications Handbook, (Feb. 1982), pp. 3-244.

*Primary Examiner*—Ulysses Weldon
*Attorney, Agent, or Firm*—Paul C. Flattery; Daniel D. Ryan; Kay H. Pierce

[57] ABSTRACT

A system is provided for increasing the control accuracy of a motor 12 which feeds back a signal to a motor control circuit 14. The motor control circuit output 20 provides a command voltage to the motor winding. The motor control circuit 14 has an input 18 for receiving an input command from a source external of the motor 12. The actual speed of the motor shaft 26 is sensed and data representative of this actual speed is transmitted through a frequency to voltage converter 36 and an analog to digital converter 40 to a microprocessor 46 which calculates an input command based upon the received actual motor speed data. The input command is transmitted from the microprocessor 46 through a digital to analog converter 58 to the motor control circuit input 18. The command voltage from the output 20 of the motor control circuit 14 is adjusted in response to variations in the input command transmitted from the microprocessor 46.

7 Claims, 4 Drawing Figures

MOTOR CONTROL SYSTEM

This is a continuation of application Ser. No. 561,685, filed Dec. 15, 1983, now abandoned.

TECHNICAL FIELD

The present invention concerns a novel system for controlling the speed of a motor and, more particularly, a system in which a motor control circuit, which receives a feedback signal from the motor and sends a command voltage to the motor, is itself controlled in an iterative procedure that tracks the actual speed of the motor.

BACKGROUND ART

DC motors are usually controlled by a motor control circuit known as a motor controller. One conventional motor controller receives an input voltage from a preset reference source external of the motor, as an input command signal. The motor controller provides the necessary output command voltage to the motor. The DC motor may have an integral generator winding which acts as a tachometer. Based on how fast the motor is rotating, the generator winding supplies a voltage back to the controller as a direct feedback. The controller then compares the feedback voltage to the preset input command voltage and uses the output command voltage to adjust the motor speed until equal values of feedback voltage and preset input voltage are obtained, if possible.

It has been found that the motor speed control in the aforesaid system is often inaccurate and that speed drift can affect system performance.

It is, therefore, an object of the present invention to provide a system for controlling the motor speed more accurately than the basic system described above.

Another object of the present invention is to provide a system for controlling the speed of a motor, which is relatively simple in operation and easy to manufacture.

Other objects and advantages of the present invention will become apparent as the description proceeds.

DISCLOSURE OF THE INVENTION

In accordance with the present invention, a system is provided for controlling the speed of a motor. The system includes a motor control circuit for providing a command voltage to the winding of the motor, with the motor control circuit having an input for receiving an input command from a source external of the motor. First means are provided for sensing a motor speed parameter, and for providing a feedback signal to the motor control circuit. Such first sensing means could comprise the generator winding of the motor which acts as a tachometer. Second means are provided for sensing the actual speed of the motor shaft. Such second sensing means could comprise a sensing device coupled directly adjacent the motor shaft.

Means are provided for receiving data representative of the actual motor speed and for calculating an input command based upon the received actual motor speed data. The input command is then transmitted to the motor control circuit input, whereby the command voltage from the motor control circuit is adjusted in response to variations in the input command.

In the illustrative embodiment, the receiving and calculating means comprises a microprocessor having an input thereof coupled to the second sensing means and an output thereof coupled to the motor control circuit input. Means are provided for storing the input command when it is calculated, for a selected period of time. At the end of the selected period of time, the calculating means are operable to calculate a new input command by subtracting $(B-C)/K$ from the stored input command, wherein B is the actual motor speed data, C is the desired motor speed data and K is a selected constant.

A more detailed explanation of the invention is provided in the following description and claims, and is illustrated in the accompanying drawings.

DETAILED DESCRIPTION OF THE ILLUSTRATIVE EMBODIMENT

Figure 1:
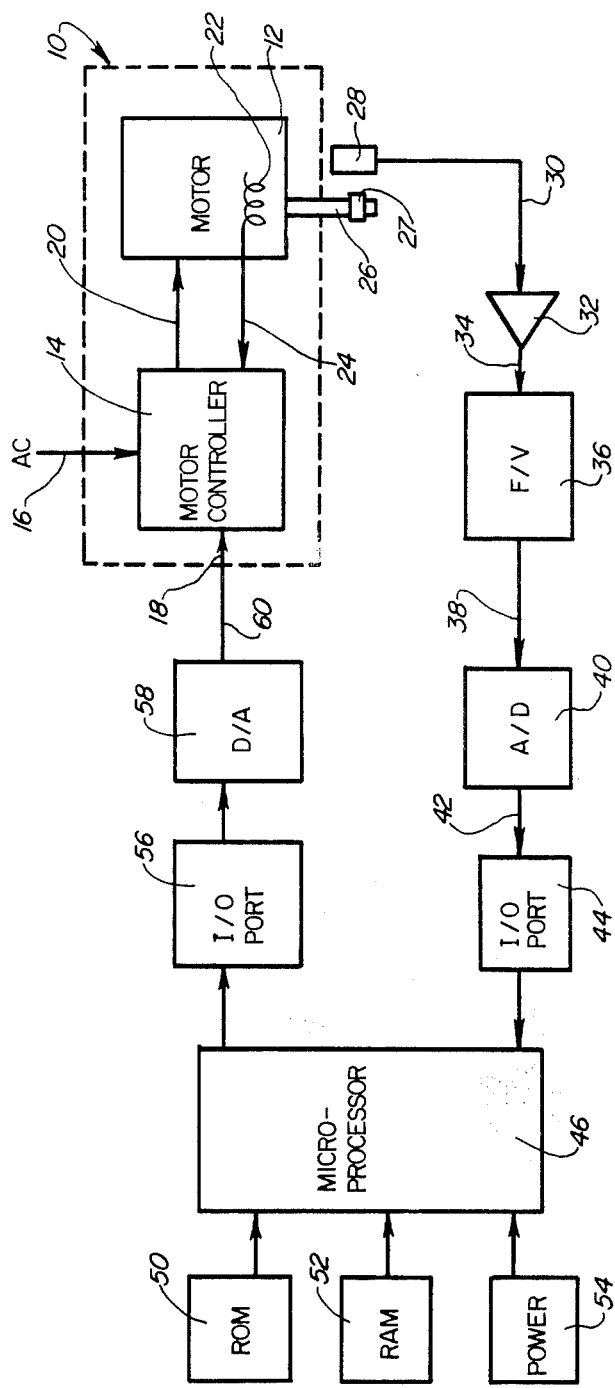
FIG. 1 is a schematic block diagram of a system for controlling the speed of the motor, constructed in accordance with the principles of the present invention.

Referring to FIG. 1, a conventional motor-motor controller set 10, comprising a DC motor 12 and a motor controller 14, is illustrated. As an illustrative example although no limitation is intended, motor-motor controller set 10 may comprise a Motomatic ® drive system Series E-586 from Electro-Craft Corporation, 1600 Second Street South, Hopkins, Minn. 55343. This Motomatic ® drive system includes a permanent magnet DC motor-generator 12 and a solid state electronic controller 14.

As is well-known in the art, motor controller 14 is powered via AC line 16 and has a reference input 18 that is external from the motor, for receiving an input command voltage. Motor controller 14 provides an output command voltage on line 20 to the winding of DC motor 12, causing rotation of the motor's winding responsive to the output command voltage on line 20. Motor 12 has an integral generator winding 22, acting as a tachometer, for supplying a feedback voltage on line 24 back to controller 14. The feedback signal received by motor controller 14 is compared with the command signal at input 18 to provide the appropriate output command voltage on line 20. In typical prior art installations, a potentiometer or the like is used to set a fixed reference voltage at motor controller input 18 and the feedback voltage from the generator winding is compared with this reference voltage.

In accordance with the present invention, an additional control of the actual running speed of the motor is provided by effectively introducing a second feedback loop into the motor control system. In other words, the actual speed of the DC motor 12 is sensed and a revised input command voltage is provided to input 18 which is calculated based upon the received actual motor speed data.

To this end, the rotational speed of the motor shaft 26 is sensed by utilizing a ring magnet 27, attached to shaft 26, with the movement of the ring magnet 27 being sensed by Hall-effect sensor 28. Although a Hall-effect sensor has been described, it is understood that various types of rotational sensing devices could be utilized.

Sensor 28 generates pulses, the frequency of which are proportional to the speed of shaft 26. These pulses are fed via line 30 to a Schmitt trigger 32 which squares up the pulses and then they are fed via line 34 to frequency to voltage converter 36. Frequency to voltage converter 36 provides an analog voltage on line 38 that is proportional to the speed of rotation of motor shaft 26. This analog voltage is fed to analog to digital converter 40 which provides pulses on line 42 to the input/output port 44 of microprocessor 46.

In prior art practice, a system similar in basic structure to that described has been used for providing only an alarm signal for overspeed or underspeed of motor 12. However, in accordance with the present invention, this system is utilized to provide an input command voltage to input 18 of motor controller 14 for controlling the speed of motor 12 accurately.

A program is stored in ROM 50 for providing appropriate commands to microprocessor 46. Microprocessor 46 is coupled in the conventional manner to RAM 52 which is powered by power supply 54 which also powers microprocessor 46. The program in ROM 50 provides a routine which allows the microprocessor 46 to utilize the feedback control loop thereby providing an input command voltage that is transmitted in digital form from input/output port 56 of microprocessor 46. The digital input command voltage is fed through a digital to analog converter 58 which outputs the input command voltage, in analog form, on line 60 to input 18 of motor controller 14.

Although the routine provided by the microprocessor may be used at various intervals, in the illustrative embodiment the routine is used every 3.3 seconds. In accordance with the present invention, the new motor input command (Y) to be fed to input 18 is equal to $A-(B-C)/K$, wherein A is the previous input command that has been stored in RAM 52, B is the actual motor speed data that is fed to input/output port 44, C is the desired motor speed data and K is a damping adjustment factor (i.e., a constant that is empirically determined).

If a speed difference does not exist such that B (the actual motor speed) is equal to C (the desired motor speed), then no correction to the motor input command speed (A) results. Thus the new motor input command (Y) is equal to A, indicating that the motor is rotating at the desired command speed.

If a speed difference exists, such that the new measured speed value (B) does not equal the desired command speed (C), then a new input command speed (Y) is computed to adjust the motor speed closer to the desired command speed. Each time the routine is executed, the motor speed will be brought closer to the desired command speed (C). The input command value is thus modified to a value higher or lower than the desired command speed (C) to force the actual running speed (B) to equal the desired command speed (C).

As an example of this operation, assume that the desired command speed for motor 12 is 1,500 rpm. Therefore, the new motor input command is equal to $Y=A=C=1,500$ to initiate motor operation. Now assume that the motor is running but that the feedback signal indicates that the actual running speed is 1,460 rpm, so that B=1,460. With an empirically determined value of K=4, a new input command speed (Y) will be calculated to be 1,510, whereby A is set equal to 1,510 for the next iteration. Microprocessor 46 will then send the new input command value of 1,510 to input 18 of motor controller 14, thereby incrementally increasing the actual running motor speed. After several iterations, the actual motor speed will approach the desired 1,500 rpm, even though the input command value at input 18 may be higher or lower than this value. In this manner, the input command to the motor controller input 18 is adjusted to compensate for motor and motor controller error.

Figure 2A:
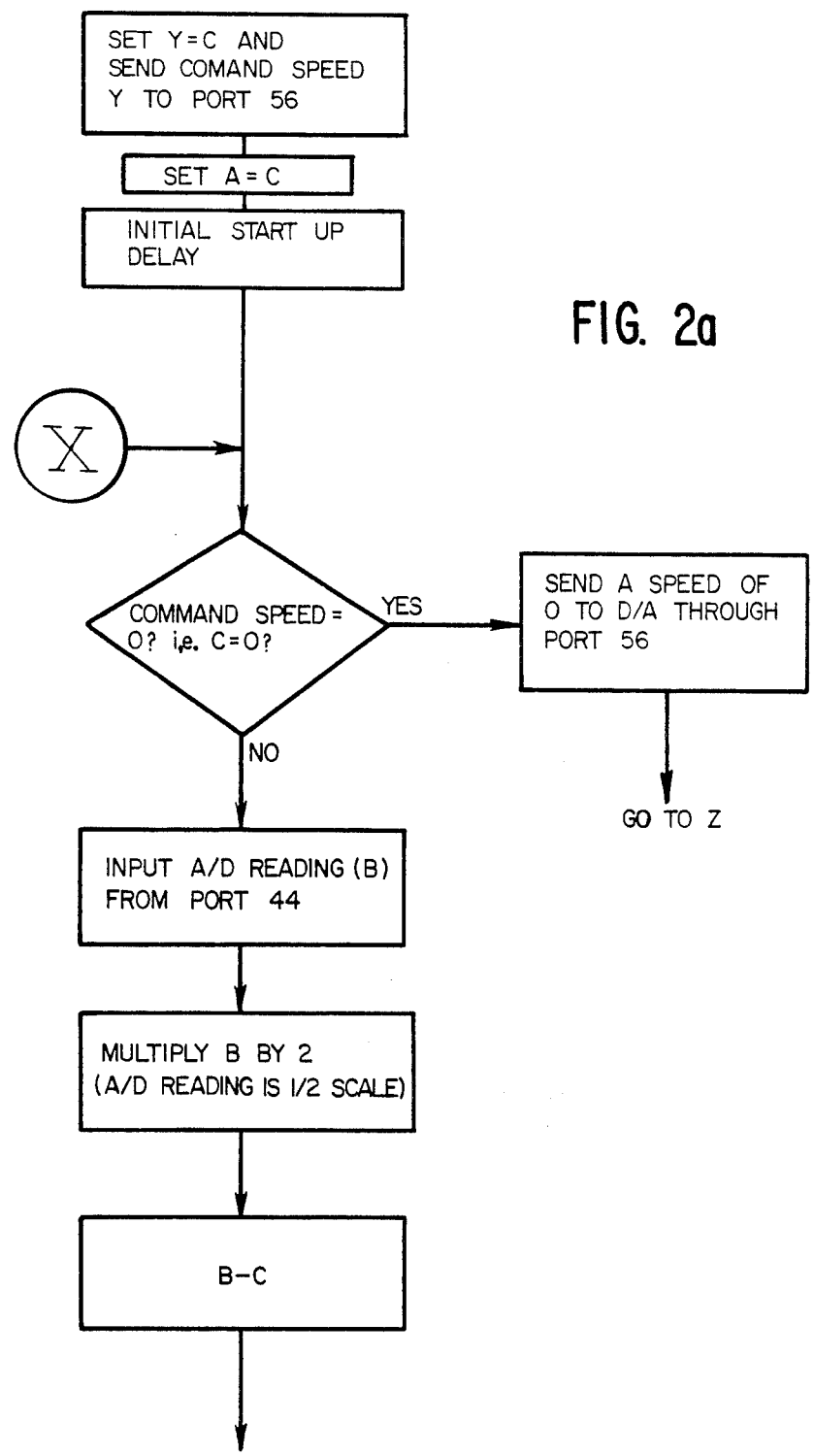
FIGS. 2A, 2B and 2C, when connected together, form a flow chart of a routine for achieving the system of the present invention.
Figure 2B:
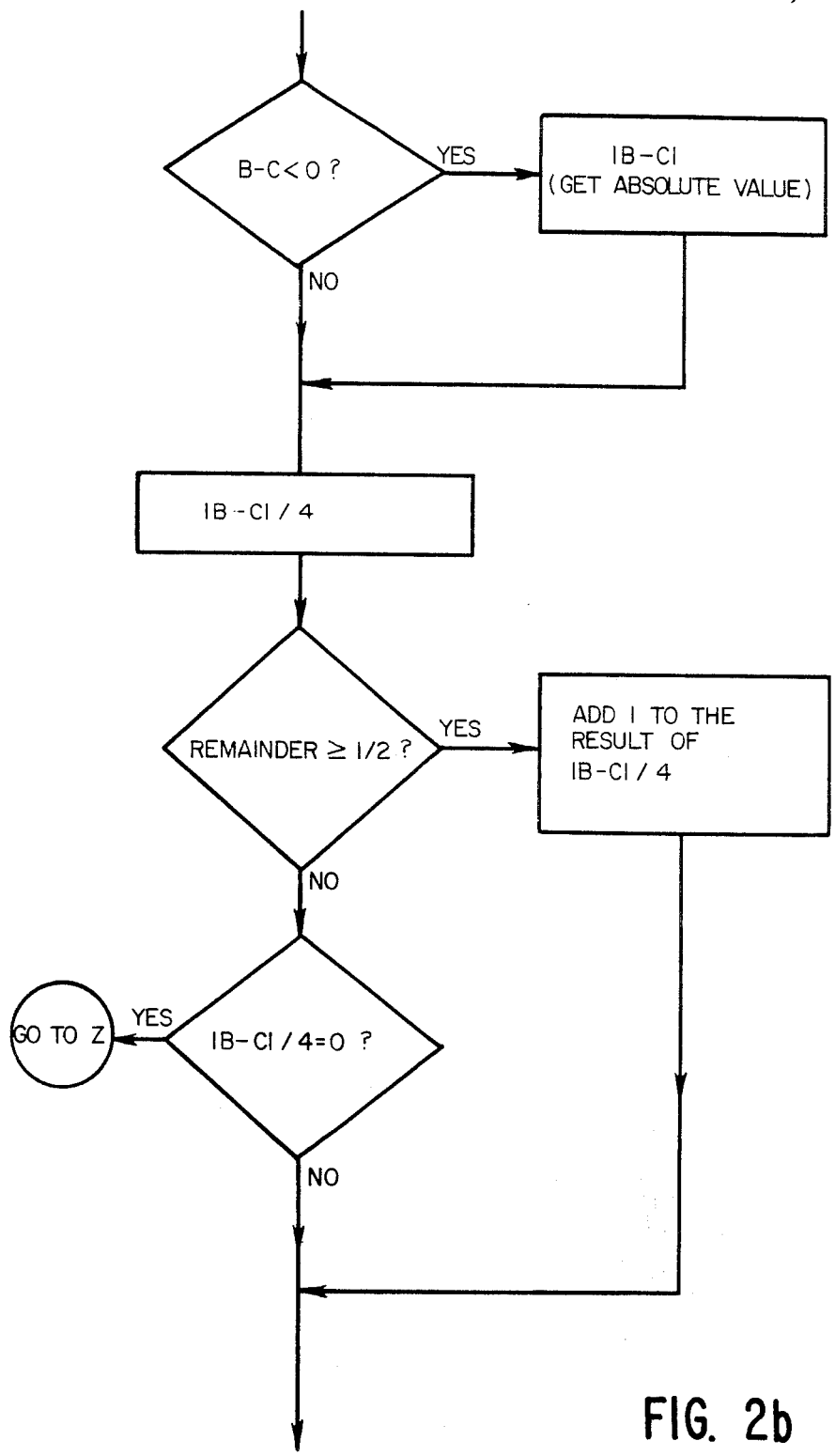
Figure 2C:
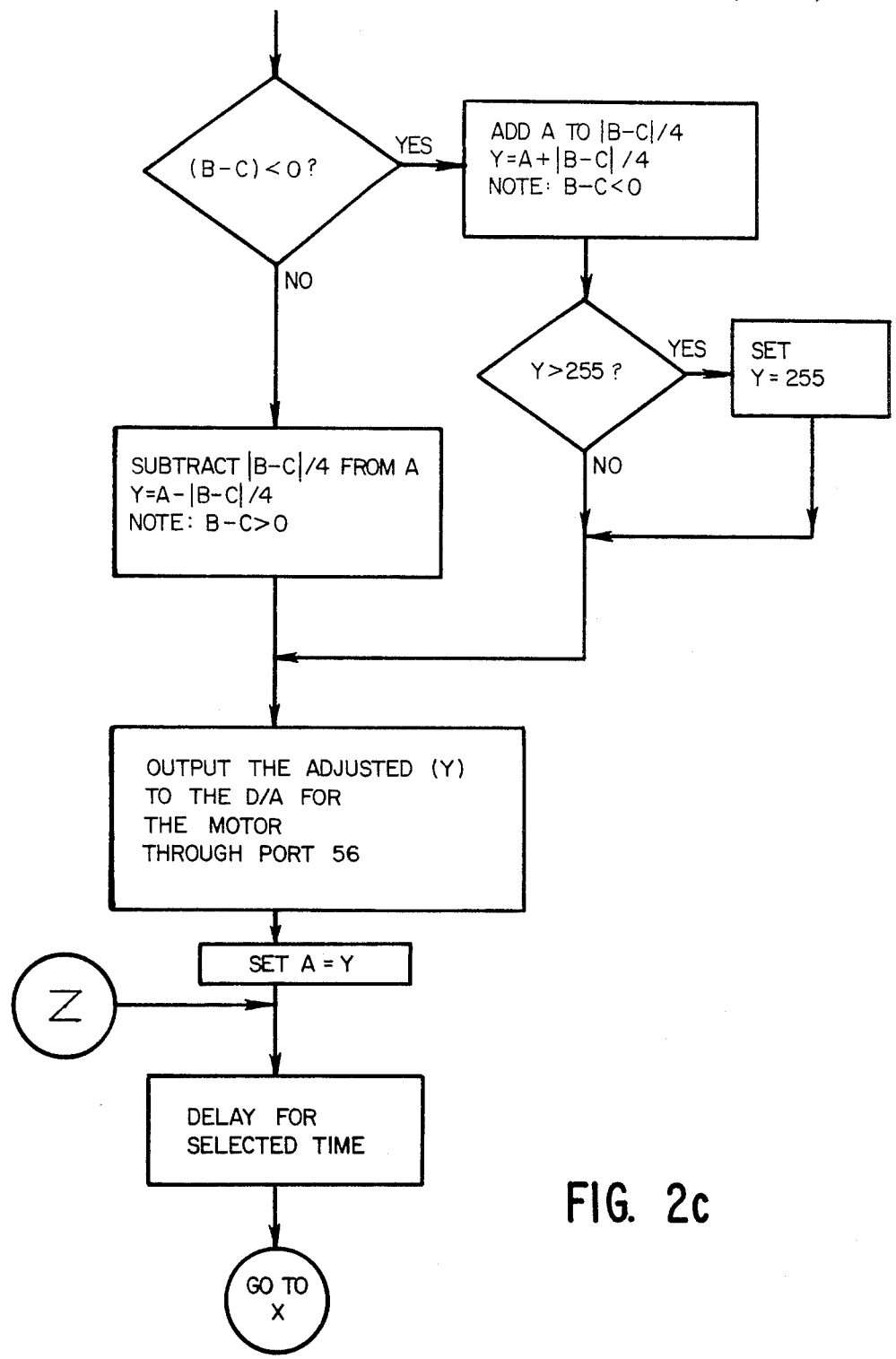

Referring now to FIGS. 2A–2C, a flow chart for the routine stored in ROM 50 is illustrated, with Y equal to the new motor input command, A equal to the previous motor input command stored in RAM 52, B equal to the actual motor speed value, C equal to the desired motor speed and K equal to the damping adjustment factor which is empirically determined in the illustrative embodiment as 4. In addition, $|B-C|$ is the absolute value of $B-C$.

It is seen by referring to the flow chart that initially the desired command speed C is sent from microprocessor 46 to port 56. There is first an initial start-up delay to allow the motor to run. It is determined whether the command speed C is zero. If it is zero, a speed of zero is sent to port 56 and the routine has ended. If the desired command speed C is not zero, the reading at the output of port 44 is fed to the microprocessor. This reading, which is the actual sensed speed B, is multiplied by two because in the illustrative embodiment the analog to digital converter is running at half scale. Then the desired speed C is subtracted from the actual speed B. If $B-C$ is less than zero, the absolute value is obtained. The absolute value of $B-C$ is divided by the constant K. If the remainder of this computation is equal to or greater than one-half, one is added to the result so it becomes rounded off upwards. If this computation equals zero, the routine is ended. If it does not equal zero, the new output to port 56 is obtained. If $B-C$ is less than zero, the absolute value of $B-C$ divided by 4 is added to A. On the other hand, if $B-C$ is not less than zero, the absolute value of $B-C$ divided by 4 is subtracted from A.

When the values are added, if the new motor input command speed (Y) is greater than 255, Y is set equal to 255 because in the illustrative embodiment an eight bit digital to analog converter 58 is used and there would be an overflow condition to converter 58 if the number were greater than 255. The adjusted speed (i.e., the new motor input command speed Y) is then fed to the digital to analog converter 58 via input/output port 56. It is then transmitted to input 18 of motor controller 14 to provide the new input command voltage for the motor controller.

Although an illustrative embodiment of the invention has been shown and described, it is to be understood that various modifications and substitutions may be made by those skilled in the art without departing from the novel spirit and scope of the present invention.

What is claimed is:

1. An improved system for controlling the speed of a motor having a motor winding and a shaft, said system including, a motor control circuit for providing a command voltage to the winding of the motor and first means for sensing a motor speed parameter and for providing a feedback signal to the motor control circuit, the improvement comprising:

second means for sensing the actual speed of the motor shaft to generate data representative of said actual speed;

calculating means for receiving said data representative of said actual speed and for periodically calculating an input command based on said data representative of said actual speed;

said calculating means being operable at selected times to calculate an input command that is equal to A−(B−C)/K, where A is an input command calculated by said calculating means during an immediately preceeding period, B is data representative of the actual speed of the motor, C is a desired motor speed data and K is a selected constant; and means for transmitting said input command to said motor control circuit input, whereby said command voltage from said motor control circuit is adjusted in response to variations in said input command.

2. A system as described in claim 1, including means for storing the input command when it is calculated, for a selected period of time, and said calculating means being operable at the end of said selected period of time to calculate a new input command.

3. An improved system for controlling the speed of a motor having a motor winding and a shaft including, a motor control circuit for providing a command voltage to the winding of the motor, said motor control circuit having an input for receiving a motor speed input command, and first means for sensing a motor speed parameter and for providing a first feedback signal to the motor control circuit, the improvement comprising second sensing means for sensing the current actual speed of the motor shaft to generate data representative of said actual speed of said motor;

receiving and calculating means for receiving said data representative of said actual speed and for calculating a first input command based upon said data;

means for storing said first input command when it is calculated, for a selected period of time, with said calculating means being operable at the end of said selected period of time, to calculate a second input command by subtracting (B−C)/K from said first input command, wherein B is the current data representative of said actual speed of said motor, C is a signal representative of a desired motor speed, and K is a selected constant;

means for transmitting said first and second input commands to said motor control circuit input, whereby said command voltage is adjusted in response to variations in said input commands;

said receiving and calculating means comprising a microprocessor having an input thereof coupled to said second sensing means and an output thereof coupled through said transmitting means to said motor control circuit input;

said transmitting means comprising a digital to analog converter having its output coupled to said motor control circuit input; and said second sensing means being coupled to said microprocessor input through a frequency to voltage converter and an analog to digital converter.

4. In a motor control circuit for providing a command voltage to the winding of the motor in which the motor control circuit has an input for receiving a motor speed input command, and means for providing to the motor control circuit a feedback signal from the motor, the improvement comprising:

means for sensing the actual speed of a motor to generate data representative of the actual speed of the motor;

means for periodically receiving data representative of the current actual speed of the motor and for calculating a first input command based upon the received data;

means for periodically storing said first input command when it is calculated, for a selected period of time, and said calculating means being operable at the end of said selected period of time to calculate a second input command by subtracting (B−C)/K from said first input command, wherein B is said current data representative of the actual speed of the motor, C is data representing a desired motor speed, and K is the selected constant; and means for transmitting said second input command to said motor control circuit input, wherein said command voltage is adjusted in response to variations in said input command.

5. In a motor control circuit as described in claim 4, said receiving and calculating means comprising a microprocessor having an input thereof coupled to said second sensing means and an output thereof coupled through said transmitting means to said motor control circuit input.

6. In a motor control circuit as described in claim 5, said second sensing means being coupled to said microprocessor input through a frequency to voltage converter and an analog to digital converter, and said motor control circuit input being coupled to said microprocessor output through said transmitting means including a digital to analog converter.

7. A system for controlling the speed of the motor used with a motor control circuit which provides a command voltage to the motor winding, and the motor control circuit has an input for receiving motor speed input commands, comprising the steps of:

selecting a desired motor speed;

sensing the actual speed of the motor and generating data that is representative of the actual speed of the motor;

calculating an input command for the motor control circuit based upon data received that is representative of the actual motor speed;

storing the input command when it is calculated for a selected period of time; and calculating a new input command by subtracting (B−C)/K from the stored input command, wherein B is the actual motor speed data, C is the selected desired speed data and K is a selected constant.

* * * * *